United States Patent [19]

Chung

[11] 4,279,361

[45] Jul. 21, 1981

[54] GEL EXTRUDING METHOD AND APPARATUS

[76] Inventor: Thomas Y. Chung, 126 E. Canon Perdido, Santa Barbara, Calif. 93101

[21] Appl. No.: 57,832

[22] Filed: Jul. 16, 1979

[51] Int. Cl.³ .......................... B67B 7/00; G01F 11/00

[52] U.S. Cl. .......................................... 222/1; 222/390

[58] Field of Search .................... 222/1, 181, 185, 390, 222/386, 395; 128/236; 401/174; 73/425.6; 422/82, 100

[56] References Cited

U.S. PATENT DOCUMENTS

| | | | |
|---|---|---|---|
| 2,715,991 | 8/1955 | Frank et al. | 222/390 |
| 3,273,763 | 9/1966 | Gilmont | 222/390 |
| 3,424,557 | 1/1969 | Skeggs | 422/82 |
| 3,734,358 | 5/1973 | Bergeron | 73/425.6 |
| 3,986,645 | 10/1976 | Baldwin et al. | 222/386 |
| 4,189,943 | 2/1980 | Faure | 73/425.6 |

FOREIGN PATENT DOCUMENTS 8863 of 1841 United Kingdom ..................... 222/390

*Primary Examiner*—H. Grant Skaggs
*Attorney, Agent, or Firm*—Ralph B. Pastoriza

[57] ABSTRACT

A method and apparatus is provided for removing polyacrylamide gels from glass or quartz tubes as required in certain biochemistry laboratory work. Essentially, the invention involves moving the plunger of a syringe in a carefully controlled manner to expel an incompressible liquid from the syringe directly into one end of the gel tube. The force of the liquid which might be water, for example, extrudes the gel from the other end of the tube so that the gel is removed without harming the gel and without shattering or otherwise damaging the gel tube itself. The apparatus of the invention comprises essentially a threaded shaft for operating the plunger of the syringe to provide the controlled movement of liquid against the gel.

2 Claims, 2 Drawing Figures

GEL EXTRUDING METHOD AND APPARATUS

This invention relates generally to laboratory instruments and more particularly to a method and apparatus for extruding gels from glass or quartz tubes.

BACKGROUND OF THE INVENTION

In biochemistry laboratory work, gels; for example, samples of proteins produced by electrophoretic operations are held in glass or quartz tubes. To remove these gels, needles or equivalent rodlike devices have been used to attempt to ream out the gel. Even more drastic measures involve actually smashing the gel tubes in order to recover the gel itself.

Because of difficulties in removing the gels from the tubes, the length of gel in such tubes has been limited.

BRIEF DESCRIPTION OF THE PRESENT INVENTION

With the foregoing considerations in mind, the present invention contemplates a novel method and apparatus for removing gel from glass or quartz tubes without the necessity of reaming the gel with needles or rods which might scratch or damage the tubes or without the necessity of actually smashing the tubes thus requiring replacement.

More particularly, in accord with the method of this invention, there is provided a substantially incompressible liquid such as water. One end of the gel tube is placed into communication with the liquid and then the liquid is gradually forced in a controlled manner into the one end of the gel tube to thereby urge the liquid against the gel and extrude the gel from the opposite end of the tube.

The preferred apparatus comprises an appropriate syringe chamber and plunger wherein the liquid is placed in the chamber of the syringe into communication with the one end of the gel tube. A clamp structure is provided with an arm of the clamp having a threaded opening for receiving a threaded shaft. Rotation of this shaft will move it downwardly in a controlled manner against the plunger of the syringe thereby forcing the liquid in the syringe against the gel in a controlled manner to effect the desired extrusion.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
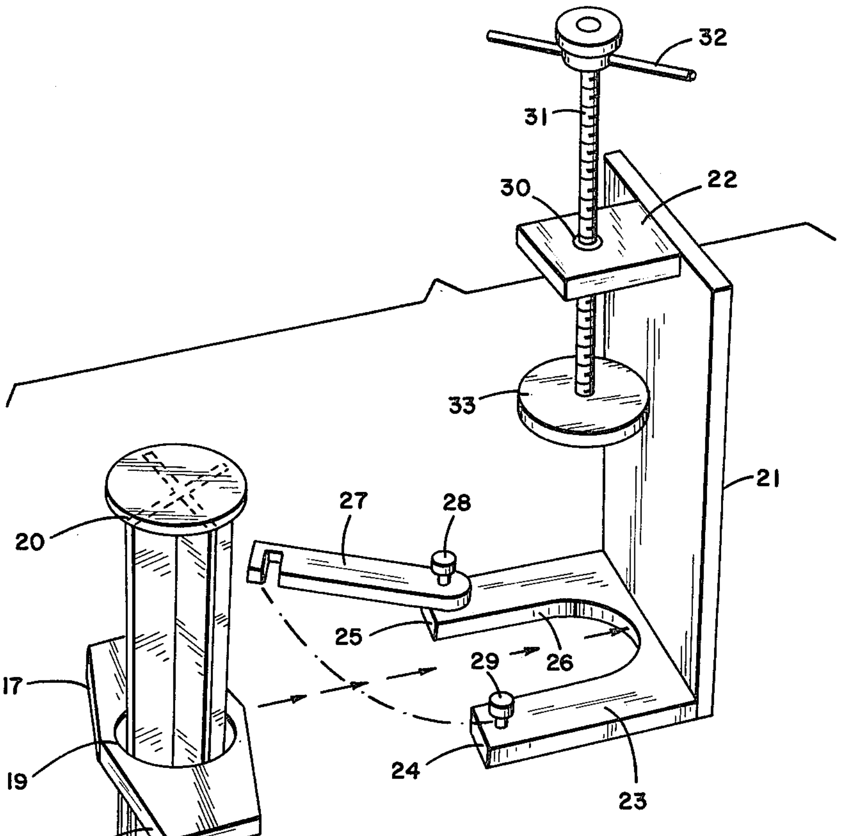
FIG. 1 is an exploded perspective view of the basic apparatus for carrying out the method of this invention wherein an actual extrusion is taking place.
Figure 1:
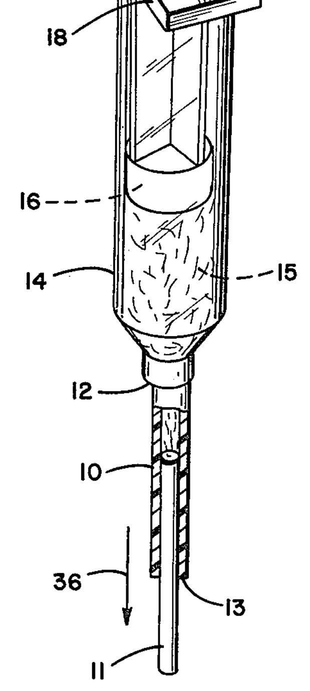

Referring first to FIG. 1, there is shown in the lower left portion thereof a typical gel tube 10 within which a gel has been formed and is shown being partially extruded at 11 in accord with the invention. In this respect, the tube 10 is open ended as at 12 and 13. The one open end 12 is shown in communication with a syringe chamber 14 containing an incompressible liquid such as water 15. A cooperating syringe plunger 16 in turn is shown in a position to urge the liquid 15 out the end of the syringe into the open end 12 of the gel tube 10.

The upper end of the chamber 14 has laterally extending shoulders 17 and 18 between which there is an opening 19 through which the plunger extends. The upper end of the plunger is indicated at 20 in FIG. 1.

It would seem that simply by utilizing the syringe chamber and plunger as described thus far, the gel material 11 could be extruded from the tube 10. However, a substantial amount of force is required in a controlled manner. Hydraulic means for removing the gel wherein liquid is applied under pressure into one end of the gel tube has been tried by utilizing the tap water pressure normally available. The problem is that the gel may all of a sudden slide within the tube and simply be blown out the other end and destroyed. The same situation can occur in applying pressure to the plunger by a person holding the syringe and attempting to effect the extrusion manually. The gel may all of a sudden become loosened and blown out with a large volume of liquid following.

In accord with the present invention, the feature of extruding the gel by hydraulic means in a controlled manner is accomplished as will now be described by an appropriate clamping frame illustrated in the upper right hand portion of FIG. 1. This clamping frame is indicated by the numeral 21 and has upper and lower arms 22 and 23. The lower arm 23 defines a forked structure, the forked portions being indicated at 24 and 25 defining therebetween a receiving opening 26. The arrangement is such that the syringe chamber 14 can be received in the opening 26 with the laterally extending shoulders 17 and 18 of the syringe resting on the forked portions 24 and 25. A locking bar 27 pivoted at 28 to the end of the forked portion 25 may be provided and appropriately swung to cover the entrance to the opening 26 after the syringe has been positioned in place. An appropriate lock down bolt 29 on the other forked portion 24 will secure the bar 27 in its closed position to thus secure the syringe in place.

Referring now to the upper portion of the clamping structure 21, the upper arm 22 includes a threaded opening 30 receiving a threaded shaft 31. A turning handle 32 is provided on the upper end of the shaft 31 above the opening 30 and a pressure plate 33 is coupled to the lower end of the shaft 31 below the opening 30. The pressure plate 33 is designed to engage the upper end 20 of the plunger for the syringe shown in FIG. 1.

Figure 2:
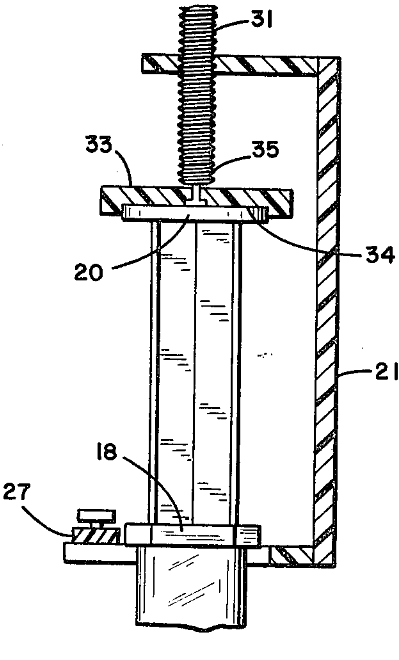
FIG. 2 is a fragmentary cross section of the components of FIG. 1 in assembled relationship.

With particular reference to FIG. 2, it will be noted that the pressure plate 33 includes an undercut cavity 34 dimensioned to receive the upper end 20 of the plunger so as to prevent lateral movement of the same under a load. The coupling of the pressure plate 33 to the end of the shaft 31 is simply a loose rotative type coupling to permit rotation of the shaft 31 while the pressure plate 33 remains rotationally stationary. In other words, 35 constitutes an appropriate thrust bearing.

From the foregoing description, the operation of this invention will be evident. Any particular gel tube from which the gel is to be extruded has one of its open ends secured to the outlet for the syringe chamber and the syringe itself is then mounted in the clamping structure 21. Slowly turning of the turning handle 32 will then thread down the pressure plate 33 on the top of the plunger 20 and thereby urge the water 15 against the gel in the tube, all in a very controlled manner. The gel will then be extruded as indicated by the arrow 36 in FIG. 1.

A variety of different types of tube gels can be removed. Such types include the 4% polyacrylamide isoelectric focusing gels in capillary tubes as well as the conventional polyacrylamide gels in quartz and glass tubes. Linear or gradient gels up to 15% polyacrylamide can be extruded with ease. In both the capillary isoelectric focusing and conventional polyacrylamide gels, the gels are normally of a minimum length of 24 CM. There is no danger of broken gels, scratched quartz tubes or the necessity to replace smashed gel tubes as a consequence of the present invention.

Because of the controlled manner of extrusion in accord with the present method and apparatus, longer gels could be utilized, resulting in increased resolution of such electrophoretic systems.

I claim:

1. A method for removing gel from a tube provided with open ends, including the steps of:

(a) confining a substantially incompressible liquid in a syringe chamber having a plunger;

(b) placing one end of said tube in communication with the outlet of said syringe chamber;

(c) placing said syringe in a clamp structure in which an arm of said clamp threadedly mounts a shaft bearing against said plunger; and, (d) gradually threading said shaft to move said plunger into said chamber and thereby force said liquid in a controlled manner into said one end of said tube to urge said liquid against the gel and thereby extrude the gel from the opposite end of said tube.

2. An apparatus for extruding gel from a tube comprising, in combination:

(a) a syringe chamber and plunger;

(b) an incompressible fluid in said syringe chamber;

(c) a clamping frame having upper and lower arms, the lower arm being forked for receiving and supporting said syringe chamber in a position in which the syringe plunger extends upwardly towards said upper arm, said upper arm having a threaded opening therethrough;

(d) a pivotally mounted lock bar on said fork swingable to a position across the opening of the fork to secure said syringe chamber in the fork;

(e) a threaded shaft threadedly received in said opening;

(f) a turning handle on the upper end of said shaft above said opening; and (g) a pressure plate coupled to the lower end of said shaft and having an undercut cavity for receiving the upper end of said plunger when said syringe chamber is received in said lower arm so that controlled rotation of said shaft in a given direction moves said pressure plate and plunger downwardly, said cavity preventing lateral shifting of said plunger under load, so that by placing one end of said gel tube in communication with the outlet of said syringe chamber, liquid can be expelled from said chamber by rotating said turning handle in said given direction to force the liquid against the gel and extrude the gel from said tube in a controlled manner.

* * * * *